United States Patent
Burns

(10) Patent No.: US 6,766,948 B1
(45) Date of Patent: Jul. 27, 2004

(54) PRODUCE PACKAGING DEVICE AND METHOD OF USE THEREOF

(76) Inventor: Arthur Dale Burns, 10460 Roosevelt, No. 133, St. Petersburg, FL (US) 33716

(*) Notice: Subject to any disclaimer, the term of this patent is extended or adjusted under 35 U.S.C. 154(b) by 24 days.

(21) Appl. No.: 10/242,182

(22) Filed: Sep. 12, 2002

(51) Int. Cl.$^7$ .............................................. G06K 15/00
(52) U.S. Cl. ...................... 235/383; 235/462.01; 53/52; 53/58; 53/427; 53/500; 53/501; 53/502
(58) Field of Search ........................... 235/383, 462.01; 53/52, 58, 527, 500, 501, 502, 427

(56) References Cited

U.S. PATENT DOCUMENTS

| | | | |
|---|---|---|---|
| 3,732,966 A | * 5/1973 | Treiber | 198/464.3 |
| 4,991,692 A | * 2/1991 | Nojiri et al. | 186/61 |
| 5,083,638 A | * 1/1992 | Schneider | 186/61 |
| RE34,324 E | * 7/1993 | Haenni et al. | 225/106 |
| RE34,856 E | * 2/1995 | Daniels | 221/63 |
| 5,992,570 A | * 11/1999 | Walter et al. | 186/36 |
| 6,189,789 B1 | * 2/2001 | Levine et al. | 235/383 |
| 6,296,186 B1 | * 10/2001 | Spencer et al. | 235/462.01 |
| 6,321,506 B1 | * 11/2001 | Rolland | 53/53 |
| 6,581,836 B2 | * 6/2003 | Main | 235/462.14 |

* cited by examiner

*Primary Examiner*—Michael G. Lee
*Assistant Examiner*—Seung H Lee

(57) ABSTRACT

A produce packaging device for weighing and packaging produce in an appropriate package based upon the produce type and quantity. In one embodiment, the device includes: (1) a scale for receiving and weighing produce to be packaged; (2) produce-type determination circuitry coupled to the scale; and (3) a control module, coupled to the scale and the produce-type determination circuitry and having a packaging database associated therewith, that (i) selects an appropriate package for the produce based upon a quantity received from the scale and a produce-type received from the produce-type determination circuitry, and (ii) causes the appropriate package to be dispensed for use in packaging the produce.

24 Claims, 2 Drawing Sheets

PRODUCE PACKAGING DEVICE AND METHOD OF USE THEREOF

TECHNICAL FIELD OF THE INVENTION

The present invention is directed, in general, to a packaging device and, more specifically, to a produce packaging device for weighing and packaging produce in an appropriate package based upon the produce type and quantity.

BACKGROUND OF THE INVENTION

Every grocery shopper has waited impatiently in line behind another shopper who is checking out a number of separately bagged items of produce. Because each produce item must be separately identified, weighed and priced, it always seems to take forever, particularly if the waiting shopper is in a hurry and the shopper checking out does not seem to be. Invariably, at least one item will require the checker to obtain assistance because the item is not on the checker's price list or because it is incorrectly priced on such list.

Not only is the grocery shopper being held up while other shoppers seem to take forever going through the check-out line, but there is always some lingering doubt as to the cleanliness of produce items once they are taken home. Every shopper can recall an instance where he or she has been selecting produce while another shopper has been coughing or sneezing while handling the same produce. Of course, there is always the shopper who insists on manually handling each and every produce item in an effort to select the choicest.

It would greatly facilitate the check-out process if each shopper would arrive at the check-out line with his or her produce items already weighed, priced and packaged. It would also provide a public health benefit if the produce items were sanitized before being removed from the store. Of course, the typical grocery store does not have the resources to devote employees to the weighing, washing and packaging of produce items. Even if a store had the manpower to do so, consumers would object to the additional cost such a service would impose which would, of course, be passed on as part of the retail price.

Accordingly, what is needed in the art is a device to package produce that can be located in a grocery store's produce department so that produce can be packaged, labeled and priced before the customer arrives at the check-out line.

SUMMARY OF THE INVENTION

To address the above-discussed deficiencies of the prior art, the present invention provides for a produce packaging device for weighing and packaging produce in an appropriate package based upon the produce type and quantity. In one embodiment, the device includes: (1) a scale for receiving and weighing produce to be packaged; (2) produce-type determination circuitry coupled to the scale; and (3) a control module, coupled to the scale and the produce-type determination circuitry and having a packaging database associated therewith that (i) selects an appropriate package for the produce based upon a quantity received from the scale and a produce-type received from the produce-type determination circuitry, and (ii) causes the appropriate package to be dispensed for use in packaging the produce.

The present invention thus provides a useful device for a grocery store to install for use by its customers that provides a convenient method for weighing, packaging and pricing produce products. This invention enables a customer to go through the grocery check-out line with produce-items already packaged and priced. In one embodiment the invention permits the packages of produce to be scanned during check-out, just as the majority of other items sold at a grocery store are scanned. This conveniently reduces the time required for the store to process its customers, because the check-out personnel will no longer be required to individually weigh and price each produce-type.

In one embodiment of the present invention, the produce packaging device can be used to package produce selected from the group consisting of string beans, corn on the cob, celery, squash, cucumbers, carrots, apples, berries, pears, peaches, and melons. Of course, any other type or kind of produce that can be packaged with the device is well within the scope of the present invention.

In another particularly useful embodiment of the present invention, the produce packaging device is further comprised of a camera that is coupled to the produce-type determination circuitry. An aspect of this embodiment provides for the produce-type determination circuitry to determine produce-type based on an image detected by the camera.

In yet still another embodiment of the present invention, the produce packaging device provides for user selection circuitry, coupled to the produce-type determination circuitry, that permits a user to designate the produce-type. As will be understood by those skilled in the pertinent art, a number of alternative forms of user selection circuitry can be used and be within the intended scope of the present invention.

In one embodiment of the present invention the produce packaging device has a packaging dispenser containing a plurality of different packaging types coupled to the scale and the produce-type determination circuitry. This embodiment will dispense packages suitable for the produce-type and quantity to be packaged.

In yet still another embodiment of the present invention, the produce packaging device is further comprised of a produce cleaning module coupled to the scale. This embodiment provides a significant public health benefit of sanitized the produce, by washing, irradiation or other means, before the produce is removed from the store.

In yet still another useful embodiment of the present invention, the produce packaging device is further comprised of a custom produce-processor coupled to the scale. The custom produce-processor enables a customer to select certain processing functions that he or she wants performed with respect to the produce at the point of purchase. Such custom processing functions are selected, in one embodiment, from the group consisting of trimming, cutting, peeling, coring, dicing, chopping, and slicing of course any other kind or type of custom processing function is well within the intended scope of the present invention.

In another embodiment of the present invention, the produce packaging device is further comprised of a label dispenser coupled to the control module for dispensing a package label. In one aspect of this embodiment the label includes the price for the produce. In still another aspect, a bar code is imprinted on the label.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
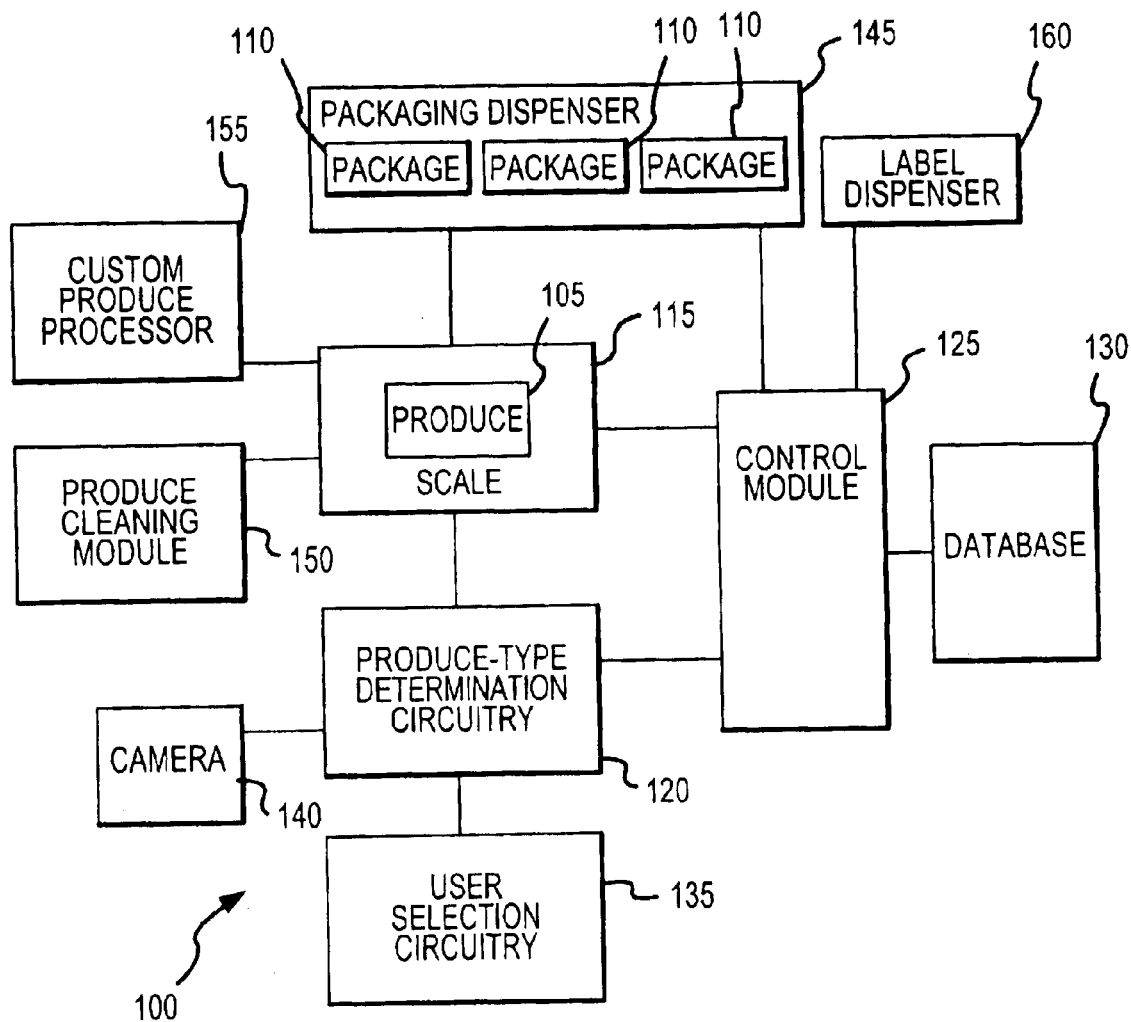
FIG. 1 illustrates a block diagram of an embodiment of a produce packaging device, constructed in accordance with the present invention, for weighing and packaging produce in an appropriate package based upon produce type and quantity.

Referring initially to FIG. 1, illustrated is a block diagram of an embodiment of a produce packaging device 100, constructed in accordance with the present invention, for weighing and packaging produce 105 in an appropriate package 110 based upon produce 105 type and quantity. The illustrated embodiment of a produce packaging device 100 provides a scale 115 for receiving and weighing produce 105. Coupled to the scale 115 is produce-type determination circuitry 120 for determining the type of produce 105 to be packaged. Coupled to the scale 115 and produce-type determination circuitry 120 is a control module 125 with an associated packaging database 130. Using information regarding the produce-type received from the produce-type determination circuitry 120 and the quantity of such produce-type received from the scale 115, the control module 125 selects and dispenses an appropriate package 110 based on data in the packaging database 130 regarding the relevant produce-type. The package 110 is dispensed in the illustrated embodiment from a packaging dispenser 145, hereinafter described in more detail.

Figure 2:
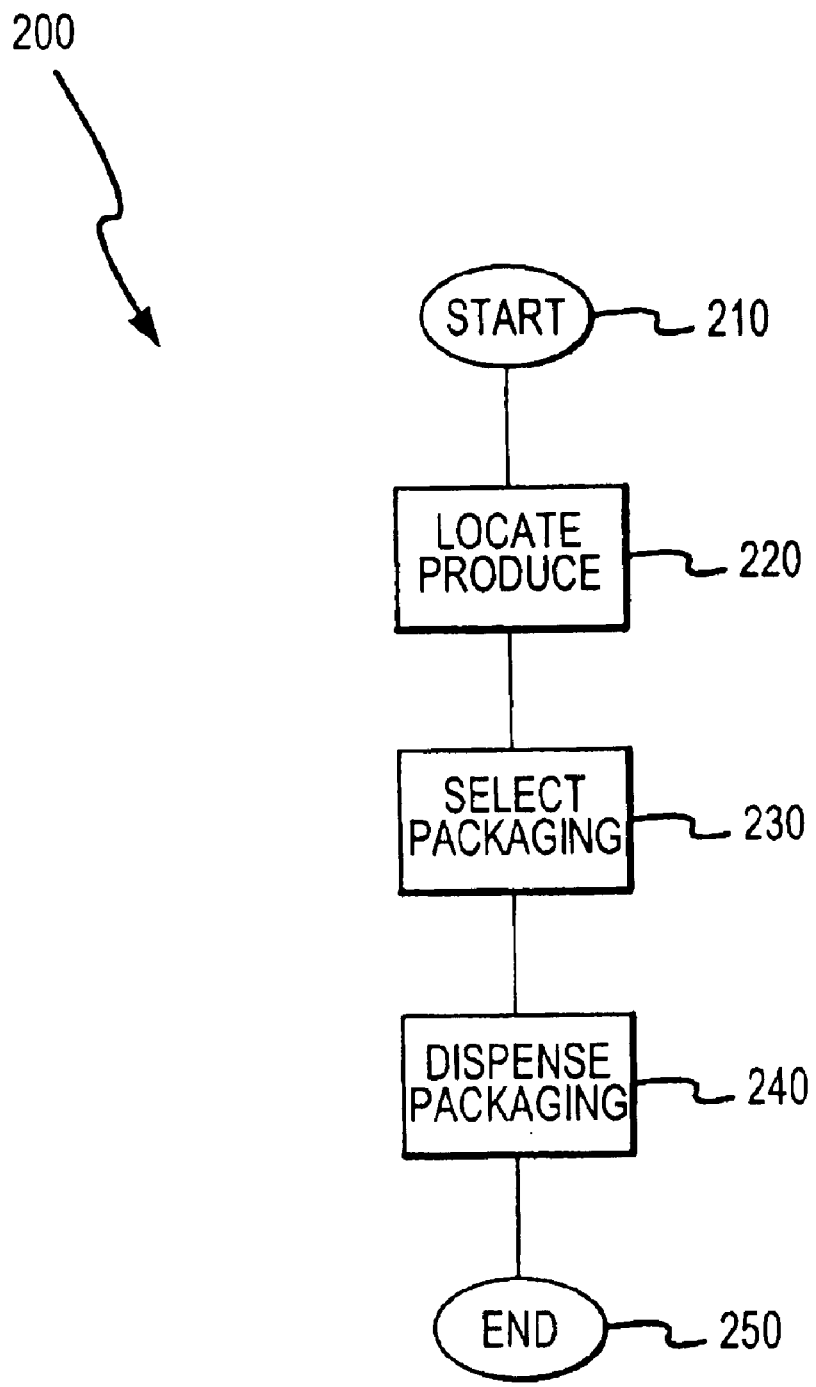
FIG. 2 illustrates a flow chart of a method of using a produce packaging device of the type represented by the block diagram in FIG. 1.

Turning now to FIG. 2, illustrated is a flow chart of a method 200 of using a produce packaging device of the type represented by the block diagram in FIG. 1. As will be understood by those of ordinary skill in the pertinent art, the present invention is particularly suited for use by a grocery store, where it will usually be located near the produce section. There are clear benefits to both the customer and the store in having a produce packaging device available. The customer benefits from time saved while checking out because he or she arrives at the check-out point with the produce already packaged and priced. The grocery store derives a direct and identifiable economic benefit because it will be able to handle more customers using fewer personnel when checkers do not have to weigh and price all the produce-items.

The method 200 commences with a start step 210. In a locate produce step 220, the customer using the device locates produce that he or she has selected on the scale. As noted with respect to FIG. 1, coupled to the scale is produce-type determination circuitry, while the control module with its associated packaging database is coupled to both the scale and produce-type determination circuitry. In a select packaging step 230, the control module selects an appropriate package based on a quantity of produce, as determined by the scale, and the produce-type, as determined by the produce-type determination circuitry. In a dispense packaging step 240, the control module causes a package to be dispensed appropriate for packaging the produce. The method 200 concludes with an end step 250.

Although the different kinds of produce that can be packaged are not illustrated, it is clear that the embodiment illustrated in FIG. 1 can use the method illustrated in FIG. 3 for packaging any type of produce and still be within the intended scope of the present invention. In one embodiment, for example, the produce packaging device can be used to package produce selected from the group consisting of: string beans, corn on the cob, celery, squash, cucumbers, carrots, apples, berries, pears, peaches, and melons. As those skilled in the pertinent art will understand, embodiments of the produce packaging device can be used in connection with the packaging of any other type or kind of produce and still be well within the intended scope of the present invention.

Turning again to FIG. 1, in one embodiment of the produce packaging device 100, user selection circuitry 135 is coupled to the produce-type determination circuitry 120. A number of different forms of produce-type determination circuitry 135 can be used and still be within the intended scope of the present invention. In one embodiment of the invention, a computer provides the produce type determination circuitry 135. Such a computer may have, for example, a touch screen displaying images of various produce-types that allows a user to select a specific produce-type by touching an image of the produce-type on the screen. In another embodiment, user selection circuitry 135 may have buttons labeled with produce-types that a user must manually press to designate the specific produce-type to be packaged.

In one particularly useful embodiment of the invention, a camera 140 is coupled to the produce-type determination circuitry 120. An aspect of this embodiment provides for the produce-type determination circuitry 120 to determine the produce-type based on the image detected by the camera 140.

Because different types and kinds of produce 105 have different packaging requirements and because amounts of produce 105 to be packaged varies, a particularly useful embodiment of a produce packaging device 100 provides for a packaging dispenser 145 coupled to the scale 115 and produce-type determination circuitry 120. The illustrated embodiment contains a plurality of different types of packages 110 and provides for a package 110 to dispensed appropriate to the specific produce-type and quantity, as determined from information provided by the produce-type determination circuitry 120 and scale 115.

In another embodiment of the invention, the produce packaging device 100 has a produce cleaning module 150 coupled to the scale 115. This embodiment permits a customer to have his or her produce 105 sanitized before it is packaged and provides a significant public health benefit. The produce 105 can be sanitized by washing or irradiation, or by any other known or subsequently developed process, all of which are within the intended scope of the present invention.

In yet still embodiment, the produce packaging device 100 has a custom produce-processor 155 coupled to the scale 115. The custom produce-processor 155 performs certain selected processing functions with respect to the produce 105 before the customer purchases it. Such custom processing functions, in one embodiment, are selected from the group consisting of trimming, cutting, peeling, coring, dicing, chopping, and slicing. Of course any other kinds or types of custom processing functions are well within the intended scope of the present invention, as the devices designed to perform such functions are developed or adapted for use with the present invention.

Another particularly beneficial embodiment of the present invention provides for a label dispenser 160 that is coupled to the control module 125. The dispensed label can be located on the package 110 before the package 110 itself is dispensed or the label can be dispensed to the customer who can place it on the package. A useful embodiment with respect to the label dispenser 160 is for the dispensed label to include a price for the produce 105 based on information from the packaging database 130 and from information furnished by the scale 115 and the produce-type determination circuitry 120. In yet still another embodiment, a useful feature of the label dispenser 160 provides for a bar code to be imprinted on the label. The bar code permits packaged produce 105 to be scanned by a checker in the same manner as other grocery items.

Although the present invention has been described in detail, those skilled in the art should understand that they can make various changes, substitutions and alterations herein without departing from the spirit and scope of the invention in its broadest form.

What is claimed is:

1. A produce packaging device, comprising:
    a scale for receiving and weighing produce to be packaged;
    produce-type determination circuitry coupled to said scale; and
    a control module, coupled to said scale and said produce-type determination circuitry and having a packaging database associated therewith, that selects an appropriate package for said produce based upon a quantity received from said scale and a produce-type received from said produce-type determination circuitry and causes said appropriate package to be dispensed for use in packaging sad produce.

2. The produce packaging device as recited in claim 1 wherein said produce is selected from the group consisting of:
    string beans,
    corn on the cob,
    celery,
    squash,
    cucumbers,
    carrots,
    apples,
    berries,
    pears,
    peaches,
    lettuce,
    cabbage, and
    melons.

3. The produce packaging device as recited in claim 1 further comprising a camera coupled to said produce-type determination circuitry.

4. The produce packaging device as recited in claim 3 wherein said produce-type determination circuitry uses an image to determine said produce-type.

5. The produce packaging device as recited in claim 1 further comprising user selection circuitry, coupled to said produce-type determination circuitry, for a user to designate said produce-type.

6. The produce packaging device as recited in claim 1 further comprising a packaging dispenser, coupled to said scale and said produce-type determination circuitry, containing a plurality of packaging types.

7. The produce packaging device as cited in claim 1 further comprising a custom produce-processor, coupled to said scale, for performing a custom processing function with respect to said produce.

8. The produce packaging device as recited in claim 1 further comprising a label dispenser, coupled to said control module, for dispensing a label for said package.

9. The produce packaging device as recited in claim 8 wherein said label provides a price for said produce.

10. The produce packaging device as recited in claim 8 wherein a bar code is imprinted on said label.

11. A produce packaging device comprising:
    a scale for receiving and weighing produce to be packaged;
    a produce cleaning module coupled to said scale;
    produce-type determination circuitry coupled to said scale; and
    a control module, coupled to said scale and said produce-type determination circuitry and having a packaging database associated therewith, that selects an appropriate package for said produce based upon a quantity received from said scale and a produce-type received from said produce-type determination circuitry and causes said appropriate package to be dispensed for use in packaging said produce.

12. A produce packaging device, comprising:
    a scale for receiving and weighing produce to be packaged;
    a custom produce-processor, coupled to said scale, for performing a custom processing function with respect to said produce, said custom processing function is selected from the group consisting of trimming, cutting, peeling, coring, dicing, chopping, and slicing;
    produce-type determination circuitry coupled to said scale; and
    a control module, coupled to said scale and said produce-type determinations circuitry and having a packaging database associated therewith, that selects an appropriate package for said produce based upon a quantity received from said scale and a produce-type received from said produce-type determination circuitry and causes said appropriate package to be dispensed for use in packaging said produce.

13. A method of using a produce packaging device, comprising:
    locating produce to be packaged on a scale for receiving and weighing produce, said scale having coupled thereto produce-type determination circuitry; and
    causing a control module, coupled to said scale and said produce-type determination circuitry and having a packaging database associated therewith, to select an appropriate package for said produce based upon a quantity received from said scale and a produce-type received from said produce-type determination circuitry, said control module causing said appropriate package to be dispensed for use in packaging said produce.

14. The method as recited in claim 13 wherein said produce is selected from the group consisting of:

string beans,
corn on the cob,
celery,
squash,
cucumbers,
carrots,
apples,
berries,
pears,
peaches,
lettuce,
cabbage, and
melons, 15. The method as recited in claim 13 further comprising a camera coupled to said produce-type determination circuitry.

16. The method as recited in claim 15 wherein said produce-type determination circuitry uses an image to determine said produce-type.

17. The method as recited in claim 13 further comprising user selection circuitry, coupled to said produce-type determination circuitry, for a user to designate said produce-type.

18. The method as recited in claim 13 further comprising a packaging dispenser, coupled to said scale and said produce-type determination circuitry, containing a plurality of packaging types.

19. The method as recited in claim 13 further comprising a custom produce-processor, coupled to said scale, for performing a custom processing function with respect to said produce.

20. The method as recited in claim 13 further comprising a label dispenser, coupled to said control module, for dispensing a label for said package.

21. The method as recited in claim 20 wherein said label provides a price for said produce.

22. The method as recited in claim 20 wherein a bar code is imprinted on said label.

23. A method of using a produce packaging device, comprising:
locating produce to be packaged on a scale for receiving and weighing produce, said scale having coupled thereto a produce cleaning module and produce-type determination circuitry; and
causing a control module, coupled to said scale and said produce-type determination circuitry and having a packaging database associated therewith to select an appropriate package for said produce based upon a quantity received from said scale and a produce-type received from said produce-type determination circuitry, said control module causing said appropriate package to be dispensed for use in packaging said produce.

24. A method of using a produce packaging device, comprising:
locating produce to be packaged on a scale for receiving and weighing produce, said scale having coupled thereto produce-type determination circuitry and a custom produce-processor for performing a custom processing function with respect to said produce, said custom processing function is selected from the group consisting of trimming, cutting, peeling, coring, dicing, chopping, and slicing; and
causing a control module, coupled to said scale and said produce-type determination circuitry and having a packaging database associated therewith, to select an appropriate package for said produce based upon a quantity received from said scale and a produce-type received from said produce-type determination circuitry, said control module causing said appropriate package to be dispensed for use in packaging said produce.

* * * * *

UNITED STATES PATENT AND TRADEMARK OFFICE
CERTIFICATE OF CORRECTION

PATENT NO. : 6,766,948 B1
DATED : July 27, 2004
INVENTOR(S) : Arthur Dale Burns

It is certified that error appears in the above-identified patent and that said Letters Patent is hereby corrected as shown below:

Column 2,
Line 54, "slicing of" should be -- slicing. Of --

Column 6,
Line 45, "determinations" should be -- determination --

Signed and Sealed this

Twenty-first Day of December, 2004

JON W. DUDAS
*Director of the United States Patent and Trademark Office*